United States Patent [19]

Kessel

[11] 4,259,983
[45] Apr. 7, 1981

[54] CLEANOUT FITTING WITH LOCKABLE AND REMOVABLE CHECK VALVE

[76] Inventor: Bernhard Kessel, Ingolstädter Str. 20, 8073 Kösching, Fed. Rep. of Germany

[21] Appl. No.: 967,852

[22] Filed: Dec. 8, 1978

[30] Foreign Application Priority Data

Dec. 10, 1977 [DE] Fed. Rep. of Germany ....... 2755177

[51] Int. Cl.³ ............................................. F16K 15/00
[52] U.S. Cl. .................................. 137/512; 137/527.2
[58] Field of Search .............................. 137/512, 527.2; 251/298

[56] References Cited

U.S. PATENT DOCUMENTS

| 650,789 | 5/1900 | Losch | 137/512 |
|---|---|---|---|
| 943,451 | 12/1909 | Parker | 137/527.2 |
| 1,052,633 | 2/1913 | Whiteman | 137/527.2 |
| 2,388,395 | 11/1945 | Duggan | 137/512 |
| 4,141,381 | 2/1979 | Eminger | 137/527.2 |

FOREIGN PATENT DOCUMENTS 1089799  3/1955  France .................................... 137/512

*Primary Examiner*—Gerald Goldberg
*Assistant Examiner*—Denis E. Corr
*Attorney, Agent, or Firm*—Karl F. Ross

[57] ABSTRACT

A cleanout fitting has a tubular body adapted to be connected between a pair of conduits and having an upwardly open well defined between the upstream and downstream end of the body. This tubular body is formed internally with a downward upstream step and a downward downstream step. At its upstream step the body is also formed with a downwardly U-shaped abutment forming a downstream-facing upstream insert seat. At its downstream step the body has a plurality of ridges defining an upwardly open U-shaped seat. Inserts, normally check valves, have rings receivable in these seats and each have a valve flap engageable with the respective ring. A cover is sealingly engageable over the well, and also serves to hold at least the downstream insert in place in the respective seat.

14 Claims, 9 Drawing Figures

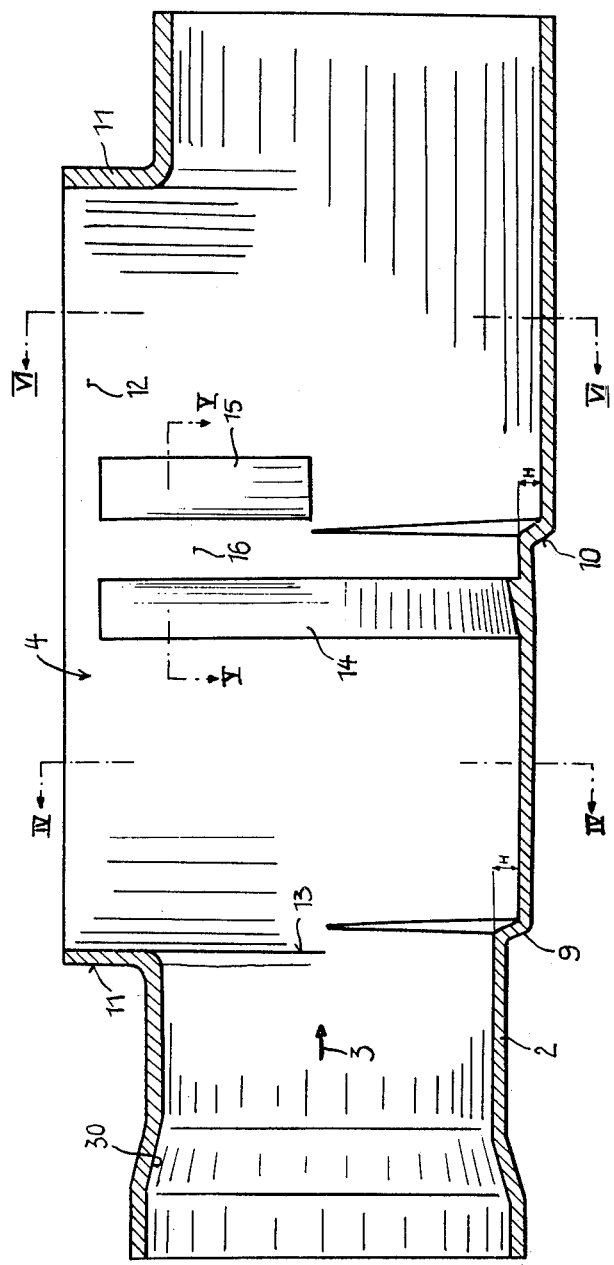

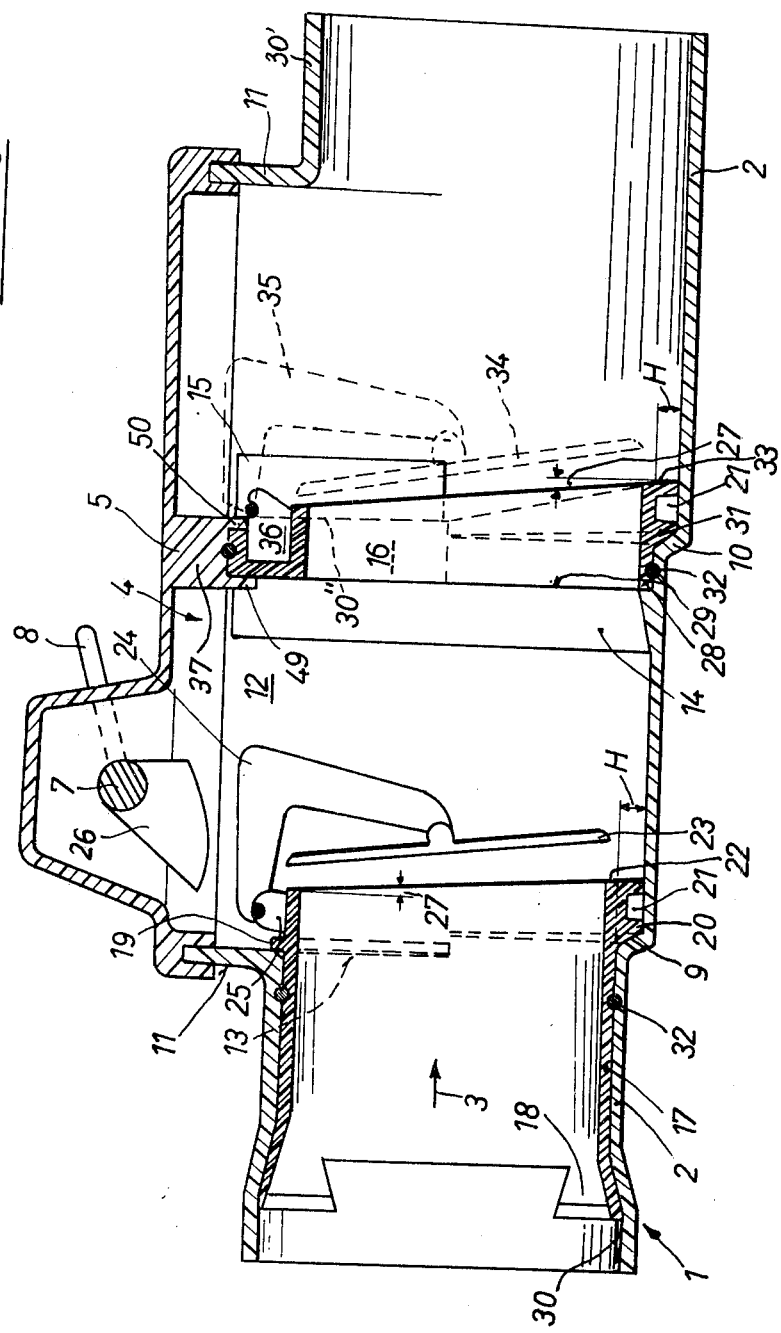

CLEANOUT FITTING WITH LOCKABLE AND REMOVABLE CHECK VALVE

FIELD OF INVENTION

The present invention relates to a cleanout fitting. More particularly this invention is concerned with such a fitting that can carry a check valve, preferably of the externally lockable type.

BACKGROUND OF THE INVENTION

A cleanout fitting is a pipe fitting normally provided in a conduit and having a laterally openable well that is closed by means of a removable cover. When the cover is opened a snake or other tool can be introduced into the conduit to clean same.

It is known to provide such a fitting at the well with one or more inserts, which can be constituted as filters, flow restrictors or, most commonly, check valves. Removing the cover of such a fitting allows the insert to be serviced. In the case of a check valve such a servicing is normally constituted by cleaning of the pivots for the valve flap and clearing of the seat.

Such a check-valve insert typically has a seat-forming flange that is secured within the cleanout fitting at the well, and which in turn carries a pivot for a valve body. The flange is secured to an inwardly directed ridge formed in the cleanout fitting and itself formed with threaded holes into which engage screws passing through corresponding holes in the flange of the check valve.

The mounting, removing, and general servicing of such a check valve is an onerous task. What is more after some use it is frequently very difficult to mount a replacement or a cleaned check valve in the fitting while forming a good seal. It is also normally impossible to retrofit such a cleanout fitting with a check valve, as after some use it becomes impossible to fit an insert of this type into the cleanout fitting on the worn and normally fouled mounting surface.

A problem with those units having an external actuator for holding the check valve closed is that the valve body, after being held for some time against the respective valve seat, freezes to this seat, so that even if the force holding it there against is relieved the valve does not open. In such an arrangement it is normally necessary to open the cleanout fitting to free the frozen valve body, an operation which in fact renders the provision of an external actuator for the valve body largely superfluous.

OBJECTS OF THE INVENTION

It is therefore an object of the invention to provide an improved cleanout fitting.

A further object is to provide such a fitting which can be easily provided with inserts, which can themselves be mounted in place in a relatively simple manner and which can be removed for servicing with ease.

Another object is to provide such a cleanout fitting which offers virtually no resistance to flow through it, yet which at the same time is internally formed in such a manner that inserts mounted therein are rigidly held.

A further object is to provide a cleanout fitting wherein the above-described problems of freezing of a valve body to its seat can be obviated.

SUMMARY OF THE INVENTION

These objects are attained according to the instant invention in a cleanout fitting having a tubular body normally connected between a pair of conduits and having between its upstream and downstream ends an upwardly open well that is normally closed by a cover. This tubular body is formed adjacent its upstream end with a downward upstream step and is formed downstream therefrom with a downward downstream step. A downwardly U-shaped abutment is formed at the upstream step and is concave toward the upstream step so as to form therewith a downstream-facing upstream seat. A formation at the downstream step forms therewith a U-shaped seat open upwardly and away from the downstream seat. An insert can be snugly received in either of these seats against displacement in the flow direction from the upstream to the downstream end.

According to further features of this invention the well is generally rectangular, having upstream and downstream walls generally perpendicular to the flow direction and side walls extending between these upstream and downstream walls and parallel to the flow direction. The upstream step is generally at the upstream wall and the downstream step is generally centrally located between the upstream and downstream walls. The downstream seat is a groove generally flush with the side walls, so that an insert received therein can also be engaged against the cover. This last-described structure obviates the need for special holding screws and the like for the downstream insert. In such an arrangement the downstream seat is, therefore, formed by an upwardly U-shaped ridge and spaced slightly downstream therefrom and level with the downstream step with a pair of further ridges each on a respective side wall.

According to the instant invention each of the insert seats receives a respective insert having a ring snugly and concentrically engaged in the tubular body and a valve body or flap snugly engageable in the valve seat formed by the respective insert ring. The insert ring of the upstream insert has forwardly extending and outwardly flared deflectable fingers that engage in a widened region at the extreme upstream end of the tubular body. The insert ring of the downstream insert is received in a groove formed by the ridges at the downstream step. Thus both these rings will be firmly held, with the upstream ring also formed with an outwardly extending ridge or projection bearing against the U-shaped abutment of the upstream seat. As the check valves are set up to allow flow in the downstream direction, little force will be effective on these rings in this direction, and in the opposite direction displacement of these rings will be impossible due to the interengaging and abutting formations on the insert rings and in the tubular body.

The valve seats of the insert rings according to this invention lie in planes inclined at an acute angle to the horizontal direction of flow through the fitting. This angle is relatively small, in the neighborhood of 80°–85°, so that an inclination of the fitting of up to 3% relative to the horizontal will not prevent proper flat seating of the valve bodies on the seats. Each of the valve bodies is carried by means of a relatively large L-shaped lever that acts as a counterweight to hold the respective valve body against the respective seat. In addition each valve body vertically overlaps the respective seat by at least 6 mm, so that a good seal between each valve body and the respective seat is always formed, even when the valve body is not perfectly aligned with the respective seat.

According to another feature of this invention one of the check-valve inserts is provided with means for holding it closed. This means can comprise a cam engageable with the respective carrying lever for the valve flap. A rod journaled in the cover carries this cam and also carries a handle that can be swung from one end position to another between a position with the cam completely free of the lever and allowing the flap to pivot and another position bearing on the lever and holding the valve flap tightly against its seat. It is also possible according to this invention to thread a spindle through the cover at an angle of substantially 45° to the flow direction and extending upstream and backwardly. This spindle has an end which can bear against the one valve flap or hook thereinto so as not only to be able to hold it tightly in place, but to be able to pull it away from the seat if necessary.

The system according to the present invention therefore also allows for the provision of means for pulling the one valve flap away from its seat. This means is normally carried on the locking device for holding the valve flat against its seat, so that when this locking device is released the valve flap is momentarily pulled away from its seat. As a result a valve flap frozen in place will be freed automatically when its actuating lever is tipped from the one end position to the other end position.

BRIEF DESCRIPTION OF THE DRAWING

FIG. 2 is an axial section through the tubular body of the fitting according to this invention;

FIG. 3 is a vertical section through the fitting according to this invention;

SPECIFIC DESCRIPTION

Figure 1:
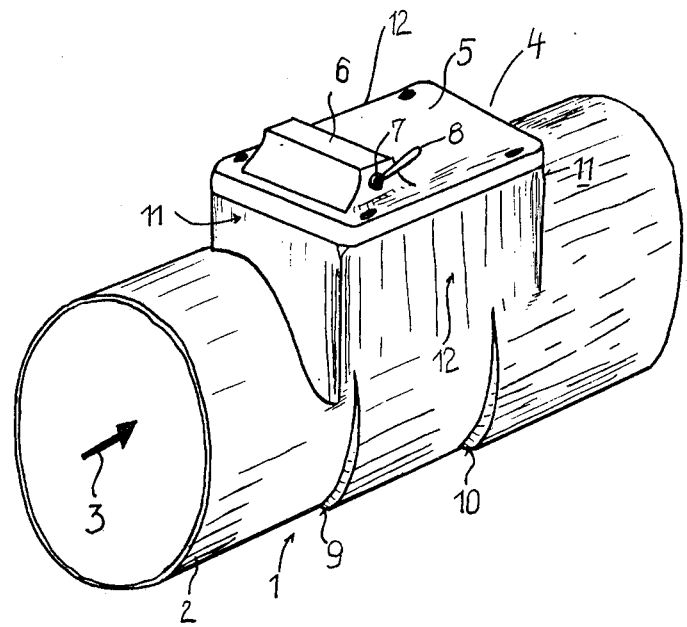
FIG. 1 is a perspective view of a fitting according to this invention.

As shown in FIGS. 1–6 a cleanout fitting 1 according to this invention basically comprises a tubular housing 2 through which a liquid passes in a horizontal flow direction 3. The tube 2 is formed with a rectangular and upwardly open cleaning well 4 normally closed by a cover 5 having a raised part 6 in which a shaft 7 is journaled for rotation about a horizontal axis lying in a plane perpendicular to the direction 3, this shaft 7 carrying a radially extending handle 8.

As better shown in FIG. 2 the tubular body part 2 is formed with an upstream step 9 and a downstream step 10 each defining a height H above the corresponding downstream portion of the tube 2. The well 4 is formed by a pair of upstream and downstream walls 11 extending perpendicular to the direction 3 and a pair of side walls 12 extending parallel to this direction 3.

Figure 4:
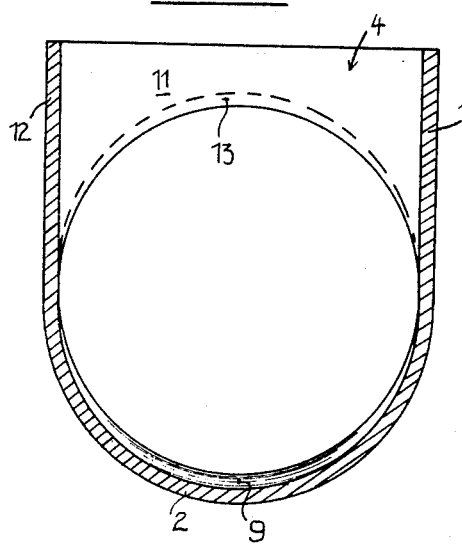
FIGS. 4, 5, and 6 are sections taken respectively along lines IV—IV, V—V, and VI—VI of FIG. 2.
Figure 6:
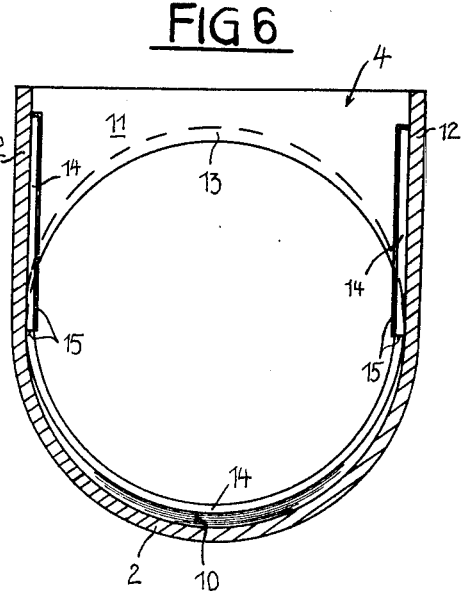
Figure 5:
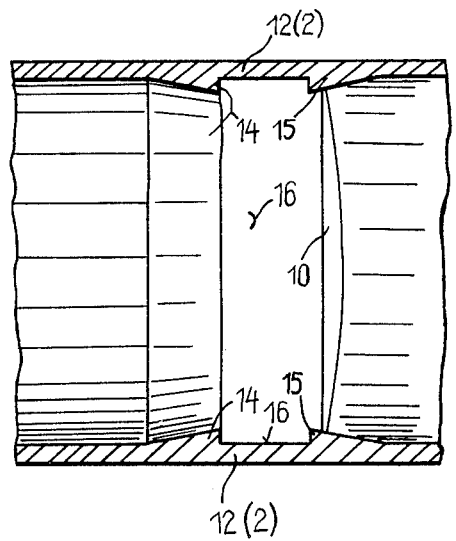

In accordance with this invention the tubular body 2 is formed internally at its upstream step 9 as best shown in FIGS. 2 and 4 with a downwardly U-shaped rib or ridge 13 aligned with the upstream wall 11 and slightly upstream of the step 9. At approximately the middle of well 4 the tubular body 2 is formed internally with an upward U-shaped rib 14 of right-triangular section so as to form a frustoconically downstream-tapering rib immediately upstream of the downstream step or ledge 10. Slightly downstream of this ledge 10 the walls 11 are formed with similarly shaped ribs 15 best seen in FIGS. 5 and 6, and which define with the rib or ridge 14 an upwardly open U-shaped groove or seat 16.

As seen in FIG. 3 the upstream end of the tubular body 2 receives an insert tube or ring 17 having at its upstream end outwardly flared and inwardly deflectable holding claws 18 that engage in a belled upstream end of the tubular body 2. In this context it is noted that the extreme downstream end 30' of the body 2 is of the same outside diameter as the inside diameter of the belled end 30 so that the fitting 1 can easily be used in a line of standard bell-and-spigot pipes. This insert ring or sleeve 17 is formed on its outer surface on its upper half with an outwardly projecting rib 19 that bears axially in an upstream direction against the rib 13 and wall 11. It has at its lower edge a further rib 20 bearing against the step 9 and forming an empty space 21 at the outer wall of the tubular body 2. An O-ring 32 surrounds the insert tube or ring 17 and bears against the inside of the tubular body 2 to form a tight seal therewith.

The downstream end of the insert ring or tube 17 is formed with a planar and circular valve seat 22 inclined at an angle 27 of between 5° and 10° to a plane perpendicular to the direction 3. A valve plate or flap 23 is pivoted on one end of an L-shaped lever 24 pivoted at its other end on lugs 25 on the upper portion of the insert ring 17. A cam 26 fixed on the shaft 7 can bear against the lever 24 to hold the flap 23 tightly against the seat 22. The weight of the lever 24 normally urges the valve body 23 against its seat 22, but flow in direction 3, even at relatively reduced pressure, is sufficient to push the valve body 23 away from the seat 22 and allow flow through the tubular body 2 in the direction 3.

Another insert ring 28 is received in the groove seat 16 and has its front planar edge 29 bearing against the rear edge of the rib 14 and its rear edge 30" bearing against the ridges 15. This insert ring 28 has a thickened edge 31 bearing against the respective step 10 and forming another space 21 identical to the space 21 of the insert ring 17. A flat rear surface 33 of this insert ring 28 forms a valve seat for another valve flap 34 carried on a L-shaped lever 35 pivoted at journal lugs 36. The cover 5 is formed with a central transverse rib 37 forming lips 49 and 50 that embrace the upper portion of the insert ring 28, with another seal ring 32 surrounding the ring 28 and forming a seal with the tubular body 2 and cover 5. Thus the cover 5 holds the insert ring 28 tightly in place.

A cleanout fitting not provided with the inserts 17 and 28 can be provided at intervals in a liquid-flow line. Removal of the cover 5 allows access to the interior of this line at any later date, and it is possible at any time to remove this cover 5 and mount inserts 17 or 28 in it. These inserts will act as excellent check valves effective in the flow direction 3. What is more the provision of the structure comprising the shafts 7, lever 8, and cam 26 allows the upstream valve 23 to be tightly closed any time. As the inserts 17 and 28 are seated against the steps 9 and 10 and the various ridges 13–15 they will be held tightly in place against displacement in the flow direction. Nonetheless their removal and replacement or servicing will be a relatively simple task. Screws normally engage through the cover 7 and hold it in place on the tubular body 2.

Figure 7:
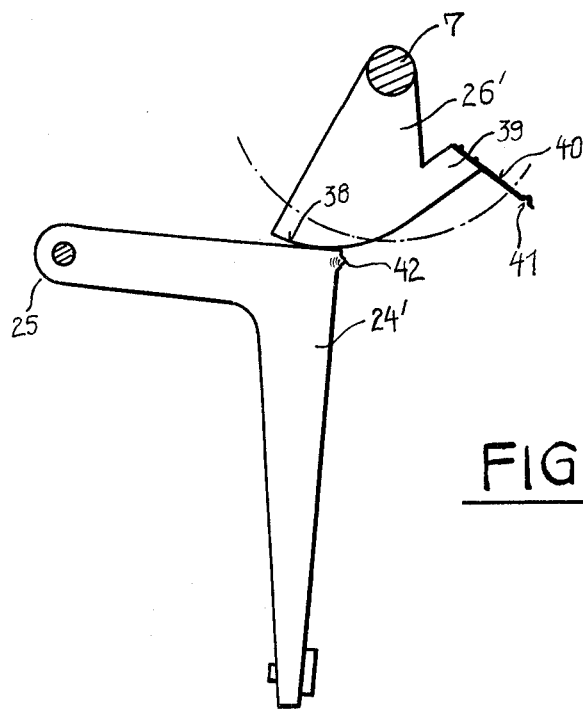
FIG. 7 is a large-scale view of a detail of an alternative arrangement according to this invention.

In FIG. 7 a cam 26' is shown which has a camming surface 38 that is extended at 39 and carries at its end a leaf-spring arm 40 formed with a hooked portion 41. In this case a lever 24' functionally identical to the lever 24 of FIGS. 1-6 is formed with a bump 42 engageable with the hook 41 when the cam 26 is pivoted in the clockwise direction as seen in FIG. 7 from its illustrated locking position to a position with its cam surface 38 out of engagement with the lever 25. Such engagement of the hook 41 over the bump 42 will exert some rotary force upon the lever 24 in a direction tending to pull its valve body away from the respective seat. Thus even if the valve body and seat are frozen together after long use this structure 41 and 42 will momentarily pull them apart as the valve is opened, so that thereafter flow will be possible through the fitting in the normal flow direction.

Figure 8:
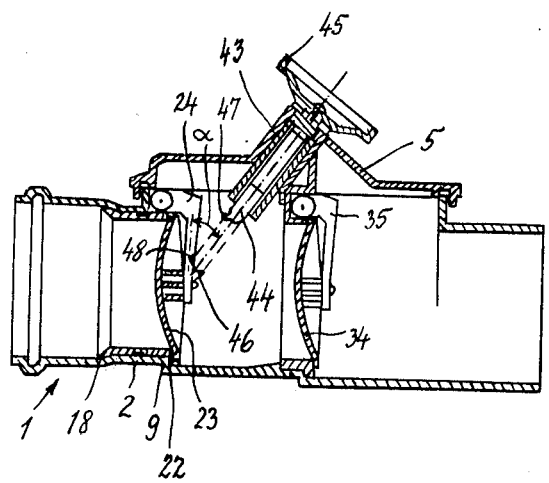
FIG. 8 is an axial section through another fitting according to the present invention.

FIG. 8 has another arrangement substantially identical to that of FIGS. 1-6 but wherein a tubular threaded spindle 43 receives a rod 44 and carries a handwheel 45. The axis of rotation of this spindle 43 extends at approximately 45° upwardly and backwardly from the flow direction 3. The rod 44 can engage a formation 46 on the back of the valve body 23 to urge it tightly against its respective seat 22. In addition this rod 44 has a hook 47 engageable in a recess 48 of this valve body 23 so when retracted it will momentarily hook into and pull the valve body 23 off its seat 22. As the force holding the valve body 23 against the seat 22 is central of the valve body 23 good all-around contact will be ensured between the two.

Figure 9:
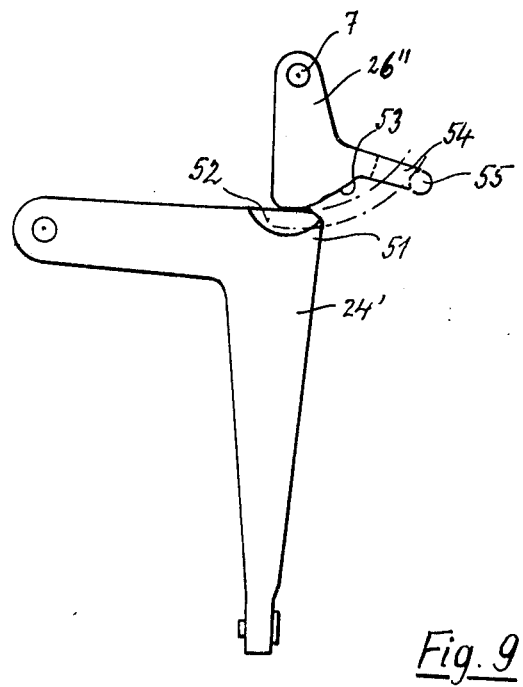
FIG. 9 is a view similar to FIG. 7 through another alternative detail of the system of the instant invention.

It is also possible to provide a cam 26'' as shown in FIG. 9 which acts on a lever 24 having a rear elbow or corner 51 formed with projections 52 extending parallel to the pivot axis for the lever 24'. The cam 26 has a caming surface 53 and an extension 54 from which project fingers 55 engageable underneath the projections 52. When the cam 26' is swung in the clockwise direction as seen in FIG. 9 the cam surface 53 will disengage the corner 51 of the lever 24. Then the fingers 55 will engage underneath the projections 52 to pivot the lever 24 backwardly and upwardly somewhat, thereby freeing the respective valve body from the respective seat.

I claim:

1. A cleanout fitting comprising:
    a one-piece tubular body having relative to a normal direction of flow through said body an upstream end and a downstream end, said body being unitarily formed with
        an upwardly open well between said ends,
        a downward upstream step adjacent said upstream end,
        a downward downstream step within said well,
        a downwardly U-shaped abutment at and concave toward said upstream step and forming therewith a downstream-facing upstream insert seat, and
        a formation at and forming with said downstream step a U-shaped downstream seat open upwardly and away from said downstream step;
    an insert snugly receivable in one of said seats; and
    a cover sealingly engageable over said well.

2. The fitting defined in claim 1 wherein said well has an upstream wall generally flush with said upstream step and a downstream wall spaced downstream of said downstream step.

3. The fitting defined in claim 2 wherein said formation is at least one ridge, said well has side walls generally perpendicular to said upstream and downstream walls and extending in the flow direction through said body, said downstream insert seat being a groove having a base generally level with said side walls.

4. The fitting defined in claim 3 wherein said ridge is generally U-shaped and open upwardly toward said well, said formation including a pair of ridge sections each extending vertically along the respective side wall of said well and lying downstream of said ridge and generally level with said downstream step.

5. The fitting defined in claim 3 wherein said insert is an upstream insert snugly receivable in said upstream seat, said fitting further comprising a downstream insert snugly receivable in said downstream seat, said inserts each having a ring engaging the respective seat and forming a valve seat, a valve body engageable with the respective valve seat, and a pivot supporting each valve body on the respective ring.

6. The fitting defined in claim 5 wherein said tubular body is formed upstream of said upstream step with a widened region, the ring of said upstream insert having outwardly flaring and inwardly deflectable holding claws engaging in an upstream direction in said widened region, the ring of said downstream insert being snugly received in said groove.

7. The fitting defined in claim 6 wherein each of said seats lies substantially in a plane inclined at an acute angle to said flow direction, said pivots each being provided with means for urging the respective valve body into engagement against said direction with the respective valve seat.

8. The fitting defined in claim 7 wherein each of said rings is formed with a downwardly extending projection bearing in the upstream direction against the respective step.

9. The fitting defined in claim 8 wherein each ring is provided with a respective annular seal engaged between the respective ring and said tubular body.

10. The fitting defined in claim 8 wherein said means includes respective upstream and downstream L-shaped levers each connected between the respective rings and pivots.

11. The fitting defined in claim 10, further comprising means for positively holding one of said valve bodies tightly against the respective seat.

12. The fitting defined in claim 11 wherein said means for holding includes a cam engageable with the lever of said one valve body.

13. The fitting defined in claim 12 wherein said means for holding includes means for momentarily pulling said one valve body away from the respective valve seat on disengagement of said cam from the respective lever.

14. A checkvalve-type cleanout fitting comprising:
    a one-piece tubular body having relative to a normal direction of flow through said body an upstream end and a downstream end, said body being unitarily formed with
        an upwardly open well between said ends,
        a downward upstream step adjacent said upstream end,
        a downward downstream step within said well,
        a downwardly U-shaped abutment at and concave toward said upstream step and forming therewith a downstream-facing upstream insert seat, and a formation at and forming with said downstream step a U-shaped downstream seat open upwardly and away from said downstream step;

an insert snugly receivable in one of said seats and including
- a ring sealingly engaging said one seat and forming a valve seat,
- a valve body engageable with said valve seat, and
- a pivot supporting said valve body on said ring; and a cover sealingly engageable over said well.

* * * * *